United States Patent
Yu et al.

(10) Patent No.: US 11,288,814 B2
(45) Date of Patent: Mar. 29, 2022

(54) SYSTEM AND METHOD OF OBJECT DETECTION BASED ON IMAGE DATA

(71) Applicant: Mujin, Inc., Tokyo (JP)

(72) Inventors: Jinze Yu, Tokyo (JP); Jose Jeronimo Moreira Rodrigues, Tokyo (JP); Xutao Ye, Tokyo (JP)

(73) Assignee: MUJIN, INC., Tokyo (JP)

( * ) Notice: Subject to any disclaimer, the term of this patent is extended or adjusted under 35 U.S.C. 154(b) by 10 days.

(21) Appl. No.: 16/909,709

(22) Filed: Jun. 23, 2020

(65) Prior Publication Data

US 2021/0019891 A1 Jan. 21, 2021

Related U.S. Application Data

(60) Provisional application No. 62/874,373, filed on Jul. 15, 2019.

(51) Int. Cl.
| | |
|---|---|
| *G06T 7/181* | (2017.01) |
| *G06T 7/33* | (2017.01) |
| *G06T 7/13* | (2017.01) |
| *G06T 7/174* | (2017.01) |

(52) U.S. Cl.
CPC ............... *G06T 7/181* (2017.01); *G06T 7/13* (2017.01); *G06T 7/174* (2017.01); *G06T 7/33* (2017.01)

(58) Field of Classification Search
CPC .. G06T 7/181; G06T 7/33; G06T 7/13; G06T 7/174; G06T 5/50; G06T 7/70; G06K 9/4604; G06Q 10/083
See application file for complete search history.

(56) References Cited

U.S. PATENT DOCUMENTS

| | | | |
|---|---|---|---|
| 10,350,755 B2 | 7/2019 | Wagner et al. | |
| 2015/0206023 A1* | 7/2015 | Kochi | ............. G06T 15/20 |
| | | | 382/199 |
| 2019/0188499 A1* | 6/2019 | Hummelshoj | ....... G05D 1/0088 |

FOREIGN PATENT DOCUMENTS

| | | | |
|---|---|---|---|
| JP | 2000-321050 A | 11/2000 | |
| JP | 2010-162638 A | 7/2010 | |
| KR | 20120067890 A * | 6/2012 | ......... G06K 9/00805 |

(Continued)

OTHER PUBLICATIONS

Office Action for related Japanese Patent Application No. 2020-114017, dated Aug. 19, 2020; English translation provided (6 pages).

(Continued)

*Primary Examiner* — Charles T Shedrick
(74) *Attorney, Agent, or Firm* — Procopio, Cory, Hargreaves & Savitch LLP

(57) ABSTRACT

A system and method of detecting objects are provided. The method includes generating first edge information from first image data representing an object based on a first mode of image capture, generating second edge information from second image data representing the object based on a second mode of image capture, the second mode being different from the first mode, fusing the first edge information with the second edge information to generate fused edge information, generating an object detection hypothesis based on the fused edge information, and validating the object detection hypothesis based on the fused edge information, the first edge information, and/or the second edge information.

8 Claims, 10 Drawing Sheets

(56) References Cited

FOREIGN PATENT DOCUMENTS

| | | | |
|---|---|---|---|
| WO | WO-0077736 A1 * | 12/2000 | ............. G06T 7/174 |
| WO | 2011/070927 A1 | 6/2011 | |
| WO | WO-2014024579 A1 * | 2/2014 | ............. G01B 11/00 |

OTHER PUBLICATIONS

Decision to Grant for related Japanese Patent Application No. 2020-114017, dated Sep. 15, 2020 (3 pages).

* cited by examiner

SYSTEM AND METHOD OF OBJECT DETECTION BASED ON IMAGE DATA

CROSS REFERENCE TO RELATED APPLICATION

This application is based upon and claims the benefit of priority from U.S. Provisional Patent Application No. 62/874,373, filed on Jul. 15, 2019, the disclosure of which is incorporated herein in its entirety by reference.

BACKGROUND

Field

The present disclosure relates to object detection, and more specifically, to systems and methods for detecting edges of objects.

Related Art

With some machine vision applications, detection of edges of objects or boxes moving along a conveyor device, stacked on a pallet, or packed in a container can be important in order to detect gaps and determine the dimensions or type of object. However, related art systems may have difficulty detecting contrast or boundaries between two objects or boxes, between an object and the surrounding environment, or between multiple objects packaged on a single pallet due to color or optical resolution of a camera or other imaging device that is being used. Related art systems relying on a single imaging device may have an increased probability of failing to find or detect the boundaries or edges around the objects. Example implementations of the present invention may address deficiencies in the related art systems.

SUMMARY OF THE DISCLOSURE

Aspects of the present invention may include a method of detecting objects. The method may include generating first edge information from first image data representing an object based on a first mode of image capture, generating second edge information from second image data representing the object based on a second mode of image capture, the second mode being different from the first mode, fusing the first edge information with the second edge information to generate fused edge information, generating an object detection hypothesis based on the fused edge information, and validating the object detection hypothesis based on the fused edge information, the first edge information, and/or the second edge information.

Additional aspects of the present invention may include a non-transitory computer readable medium encoded with instructions for making a computing device execute a method of detecting objects. The method may include generating first edge information from first image data representing an object based on a first mode of image capture, generating second edge information from second image data representing the object based on a second mode of image capture, the second mode being different from the first mode, fusing the first edge information with the second edge information to generate fused edge information, generating an object detection hypothesis based on the fused edge information, and validating the object detection hypothesis based on the fused edge information, the first edge information, and/or the second edge information Further aspects of the present invention may include a computing system for detecting objects using machine vision. The computing system may include a system interface and a processor communicatively coupled to the system interface. The system interface may be configured for receiving first image data representing an object based on a first mode of image capture and receiving second image data representing the object based on a second mode of image capture, the second mode being different from the first mode. The processor may be configured to perform an object detection method. The method may include generating first edge information from the first image data representing an object based on a first mode of image capture, generating second edge information from the second image data representing an object based on a second mode of image capture, the second mode being different from the first mode, fusing the first edge information with the second edge information to generate fused edge information, generating an object detection hypothesis based on the fused edge information, and validating the object detection hypothesis based on the fused edge information, the first edge information, and/or the second edge information.

Additional aspects of the present invention may include another object detection system for detecting objects using machine vision. The system may include devices configured to capture images of a first image capture mode and capture images of a second image capture mode, devices configured to generate first object edge information from image data collected with a first mode of image capture and generate second object edge information from image data collected with a second mode of image capture, the second mode being different from the first mode, a processor. The processor may be configured to fuse the first object edge information and the second object edge information to generate fused edge information, generate an object detection hypothesis based on the fused edge information, and validate the object detection hypothesis based on the fused edge information, the first object edge information, and the second object edge information.

BRIEF DESCRIPTION OF THE DRAWINGS

Exemplary embodiment(s) of the present invention will be described in detail based on the following figures, wherein.

DETAILED DESCRIPTION

Figure 1A:
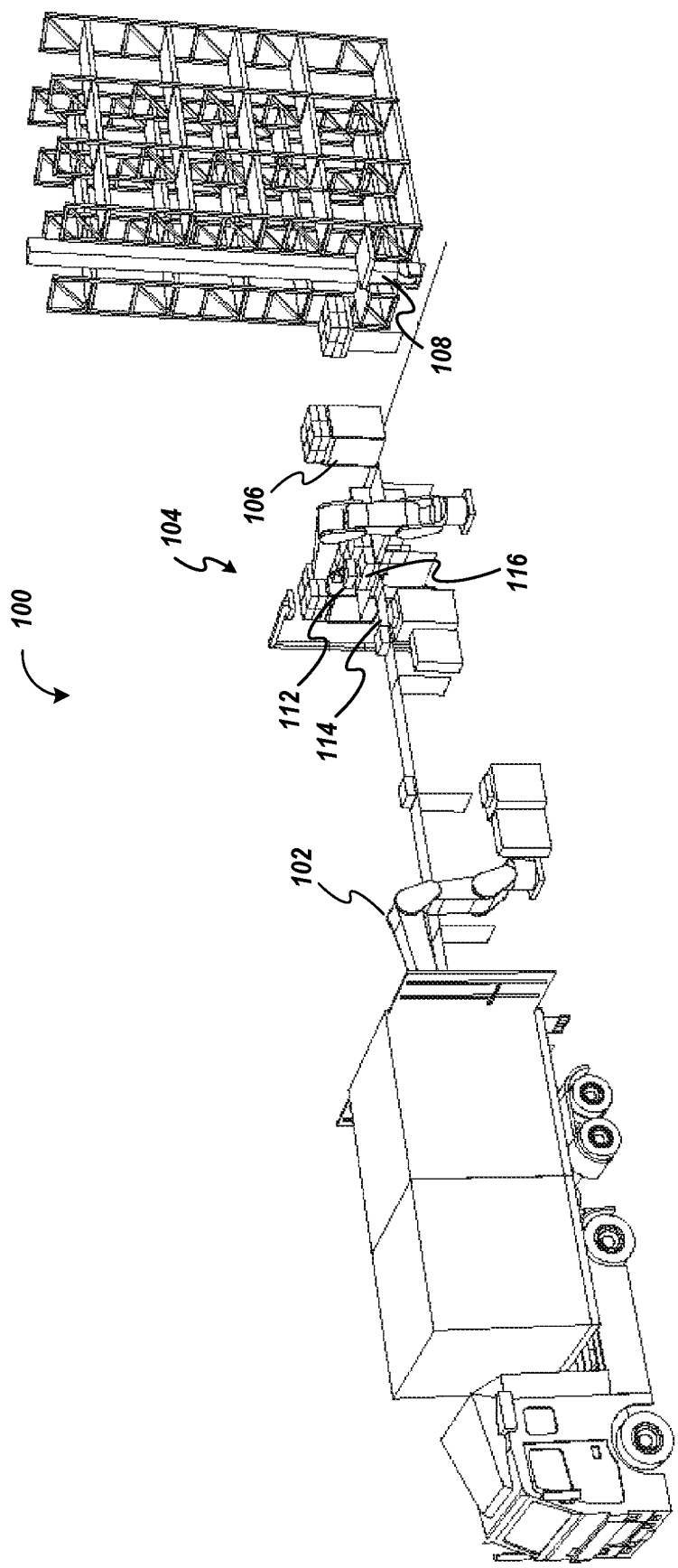
FIG. 1A is an illustration of an example environment in which a robotic system incorporating example embodiments of the present invention may be used.

The following detailed description provides further details of the figures and example implementations of the present invention. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present invention. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present invention.

In the present invention, the term "computer readable medium" may include a local storage device, a cloud-based storage device, a remotely located server, or any other storage device that may be apparent to a person of ordinary skill in the art.

Example implementations of machine vision or object detection systems according to the present invention may improve the probabilities of detection of object edges, such as through detection of gaps or spaces between objects or boxes, by using two or more modes of image data to detect gaps or contrast differences between objects. By using two or more modes of image data, differences in material, background, case or objects, environmental lighting, or reflection may be detected, and, based on these detections, the computing system can generate fused edge information to identify edges between gaps, or point clouds in order to determine object sizes. Further, as explained below, by fusing edge information detected using different modes of image data, example implementations may see the surrounding contour of the object or box, which is the edges of the box on the map, resulting in a higher possibility to define this region and give correct detection hypothesis for later processing. By improving the probability of detecting object positions and contours, objects may be better tracked and located within an industrial processing, packing, or shipping facility.

The example implementations described herein may relate to tracking of pallets or boxes moving through a sorting or manufacturing facility. However, example implementations are not limited to these applications. Example implementations of processes and systems described herein may also be used for 3D mapping, autonomous visions or any other applications that may benefit from improved edge detection. Compared to conventional edge detection systems, example implementations may provide enhanced edge detection results by using more modules of data to overcome the weakness or limitations of different sensing devices and combine the strength or capabilities to the given environment.

Suitable Environments

FIG. 1A is an illustration of an example environment in which a robotic system 100 having machine vision or object detection systems in accordance with example embodiments of the present application. The robotic system 100 includes one or more structures (e.g., robots) configured to execute one or more tasks. Aspects of the piece-loss management mechanism can be practiced or implemented by the various structures.

For the example illustrated in FIG. 1A, the robotic system 100 can include an unloading unit 102, a transfer unit 104, a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van for storage in a warehouse, or to unload objects from storage locations and load them onto a truck or a van for shipping. For another example, the task can include moving objects from one container to another container. Each of the units can be configured to execute a sequence of actions (e.g., operating one or more components therein) to execute a task.

In some embodiments, the task can include manipulation (e.g., moving and/or reorienting) of a target object 112 (e.g., boxes, cases, cages, pallets, etc.) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 (e.g., a palletizing robot) can be configured to transfer the target object 112 from a location on the conveyor belt to a location on the transport unit 106, such as for loading the target object 112 on a pallet on the transport unit 106.

According to another example embodiment, the transfer unit 104 (e.g., a piece-picking robot) can be configured to transfer the target object 112 from one container to another container. In completing the operation, the transport unit 106 can transfer the target object 112 from an area associated with the transfer unit 104 to an area associated with the loading unit 108. The loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments and for other purposes, such as for manufacturing, assembly, packaging, healthcare, and/or other types of automation. It is also understood that the robotic system 100 can include other units, such as manipulators, service robots, modular robots, etc., not shown in FIG. 1.

For example, in some embodiments, the robotic system 100 can include a depalletizing unit for transferring the objects from cages, carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

Suitable System

Figure 1B:
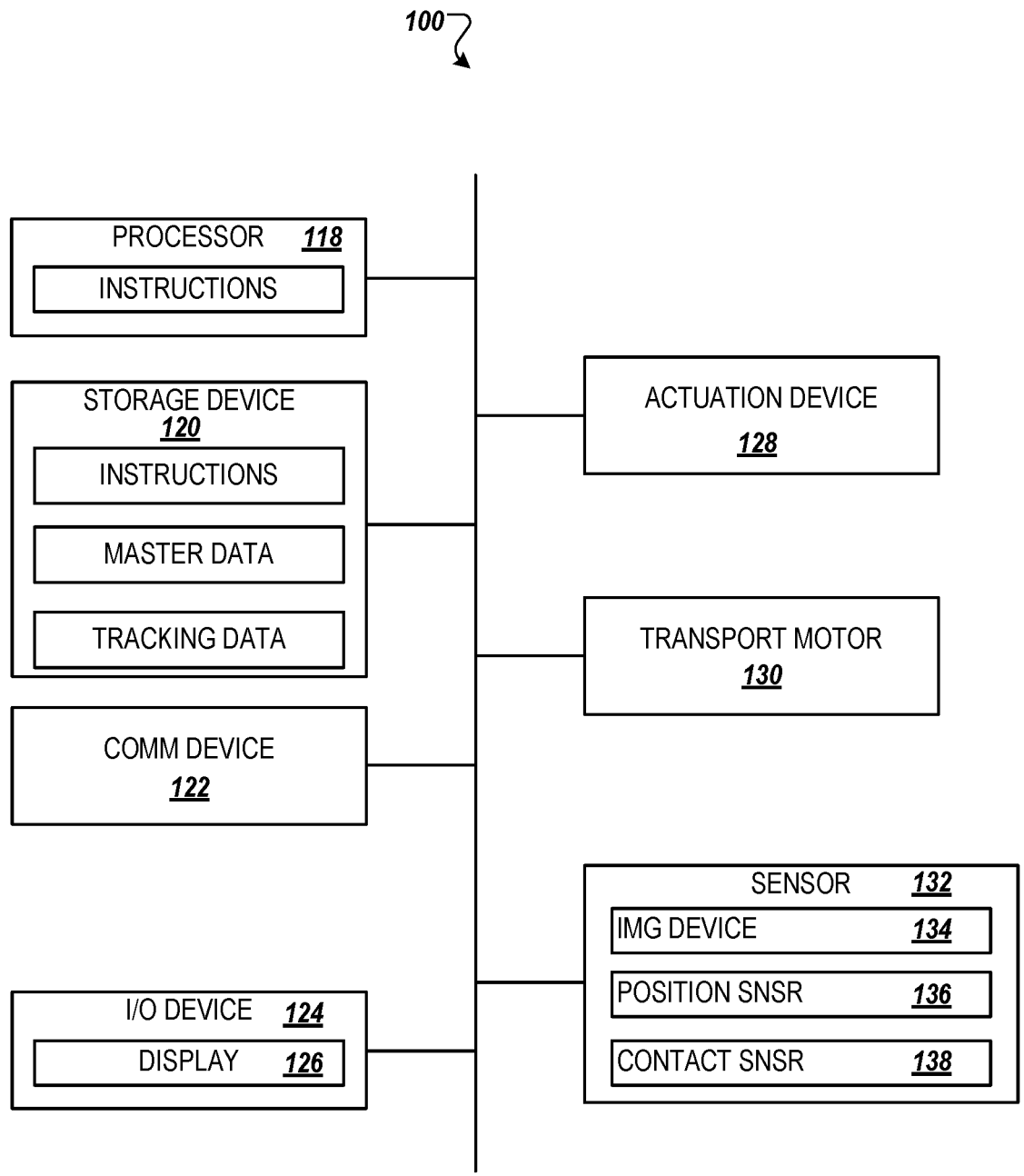
FIG. 1B is a block diagram illustrating the robotic system incorporating example embodiments of the present invention may be used.

FIG. 1B is a block diagram illustrating the robotic system 100 having machine vision or object detection systems in accordance with example embodiments of the present technology. In some embodiments, for example, the robotic system 100 (e.g., at one or more of the units and/or robots described above) can include electronic/electrical devices, such as one or more processors 118, one or more storage devices 120, one or more communication devices 122, one or more input-output devices 124, one or more actuation devices 128, one or more transport motors 130, one or more sensors 132, or a combination thereof.

The various devices can be communicatively coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "FIREWIRE"). Also, for example, the robotic system 100 can include bridges, adapters, controllers, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 118 can include data processors (e.g., central processing units (CPUs), special-purpose computers, and/or onboard servers) configured to execute instructions (e.g., software instructions) stored on the storage devices 120 (e.g., computer memory). The processors 118 can implement the program instructions to control/interface with other devices, thereby causing the robotic system 100 to execute actions, tasks, and/or operations.

The storage devices 120 can include non-transitory computer-readable media having stored thereon program instructions (e.g., software). Some examples of the storage devices 120 can include volatile memory (e.g., cache and/or random-access memory (RAM) and/or non-volatile memory (e.g., flash memory and/or magnetic disk drives). Other examples of the storage devices 120 can include portable memory drives and/or cloud storage devices.

In some embodiments, the storage devices 120 can be used to further store and provide access to processing results and/or data/thresholds (e.g., predetermined data and thresholds). For example, the storage devices 120 can store master data that includes descriptions of objects (e.g., boxes, cases, and/or products) that may be manipulated by the robotic system 100. In one or more embodiments, the master data can include a dimension, a shape (e.g., templates for potential poses and/or computer-generated models for recognizing the object in different poses), a color scheme, an image, identification information (e.g., barcodes, quick response (QR) codes, logos, etc., and/or expected locations thereof), an expected weight, or a combination thereof for the objects expected to be manipulated by the robotic system 100. In some embodiments, the master data can include manipulation-related information regarding the objects, such as a center-of-mass location on each of the objects, expected sensor measurements (e.g., for force, torque, pressure, and/or contact measurements) corresponding to one or more actions/maneuvers, or a combination thereof.

Also, for example, the storage devices 120 can store object tracking data. In some embodiments, the object tracking data can include a log of scanned or manipulated objects. In some embodiments, the object tracking data can include image data (e.g., a picture, point cloud, live video feed, etc.) of the objects at one or more locations (e.g., designated pickup or drop locations and/or conveyor belts). In some embodiments, the object tracking data can include locations and/or orientations of the objects at one or more locations.

The communication devices 122 can include circuits configured to communicate with external or remote devices via a network. For example, the communication devices 122 can include receivers, transmitters, modulators/demodulators (modems), signal detectors, signal encoders/decoders, connector ports, network cards, etc. The communication devices 122 can be configured to send, receive, and/or process electrical signals according to one or more communication protocols (e.g., the Internet Protocol (IP), wireless communication protocols, etc.). In some embodiments, the robotic system 100 can use the communication devices 122 to exchange information between units of the robotic system 100 and/or exchange information (e.g., for reporting, data gathering, analyzing, and/or troubleshooting purposes) with systems or devices external to the robotic system 100.

The input-output devices 124 can include user interface devices configured to communicate information to and/or receive information from operators (e.g., human operators). For example, the input-output devices 124 can include a display 126 and/or other output devices (e.g., a speaker, a haptics circuit, or a tactile feedback device, etc.) for communicating information to the human operator. Also, the input-output devices 124 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 124 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 128 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 130 configured to transport the corresponding units/chassis from place to place.

The robotic system 100 can include the sensors 132 configured to obtain information used to implement the tasks, such as for manipulating the structural members and/or for transporting the robotic units. The sensors 132 can include devices configured to detect or measure one or more physical properties of the robotic system 100 (e.g., a state, a condition, and/or a location of one or more structural members/joints thereof) and/or for a surrounding environment. Some examples of the sensors 132 can include accelerometers, gyroscopes, force sensors, strain gauges, tactile sensors, torque sensors, and position encoders.

In some embodiments, for example, the sensors 132 can include one or more imaging devices 134 (e.g., 2-dimensional and/or 3-dimensional cameras including visual and/or infrared cameras, LADARs, RADARs, and/or other distance-measuring or imaging devices) configured to detect the surrounding environment. The imaging device 134 can detect and generate a representation of the detected environment, such as a digital image and/or a point cloud, used for implementing machine/computer vision (e.g., for automatic inspection, robot guidance, or other robotic applications). As described in further detail below, the robotic system 100 (via, e.g., the processors 118) can process the digital image and/or the point cloud to identify the target object 112 of FIG. 1A, the start location 114 of FIG. 1A, the task location 116 of FIG. 1A, a pose of the target object 112 of FIG. 1A, or a combination thereof.

For manipulating the target object 112, the robotic system 100 (e.g., via the various units) can capture and analyze an image of a designated area (e.g., inside the truck, inside the container, or a pickup location for objects on the conveyor belt) to identify the target object 112 and the start location 114 thereof. Similarly, the robotic system 100 can capture and analyze an image of another designated area (e.g., a drop location for placing objects on the conveyor belt, a location for placing objects inside the container, or a location on the pallet for stacking purposes) to identify the task location 116.

Also, for example, the sensors 132 can include position sensors 136 (e.g., position encoders, potentiometers, etc.) configured to detect positions of structural members (e.g., the robotic arms and/or the end-effectors) and/or corresponding joints of the robotic system 100. The robotic system 100 can use the position sensors 136 to track locations and/or orientations of the structural members and/or the joints during execution of the task.

In some embodiments, the sensors 132 can include contact sensors 138 (e.g., pressure sensors, force sensors, strain gauges, piezoresistive/piezoelectric sensors, capacitive sensors, elastoresistive sensors, and/or other tactile sensors) configured to measure a characteristic associated with a direct contact between multiple physical structures or surfaces. The contact sensors 138 can measure the characteristic that corresponds to a grip of the end-effector (e.g., the gripper) on the target object 112. Accordingly, the contact sensors 138 can output a contact measure that represents a quantified measure (e.g., a measured force, torque, position, etc.) corresponding to a degree of contact or attachment between the gripper and the target object 112. For example, the contact measure can include one or more force or torque readings associated with forces applied to the target object 112 by the end-effector. Details regarding the contact measure are described below.

As described in further detail below, the robotic system 100 (via, e.g., the processors 118) can implement different actions to accomplish the task based on the contact measure. For example, the robotic system 100 can regrip the target object 112 if the initial contact measure is below a threshold. Also, the robotic system 100 can intentionally drop the target object 112, adjust the task location 116, adjust a speed or an acceleration for the action, or a combination thereof, if the contact measure falls below a threshold during execution of the task.

Example embodiments of end effectors (e.g., the gripper) according to the present application may have greater flexibility in tool selection and customization by providing a capability to change a tool head based on needed capabilities. For example, variable grippers may be swapped to match the type of object to be grasped. Matching may be done based on the size of the object, the delicacy of the object, or any other factor that might be apparent to a person of ordinary skill in the art. This change ability is provided by a connector structure communicatively coupled to a control module configured to sense the change in tool and adjust signal I/O operation and supplied compressed air feeds to correspond to the requirements of the new tool.

Example Implementations

Figure 2:
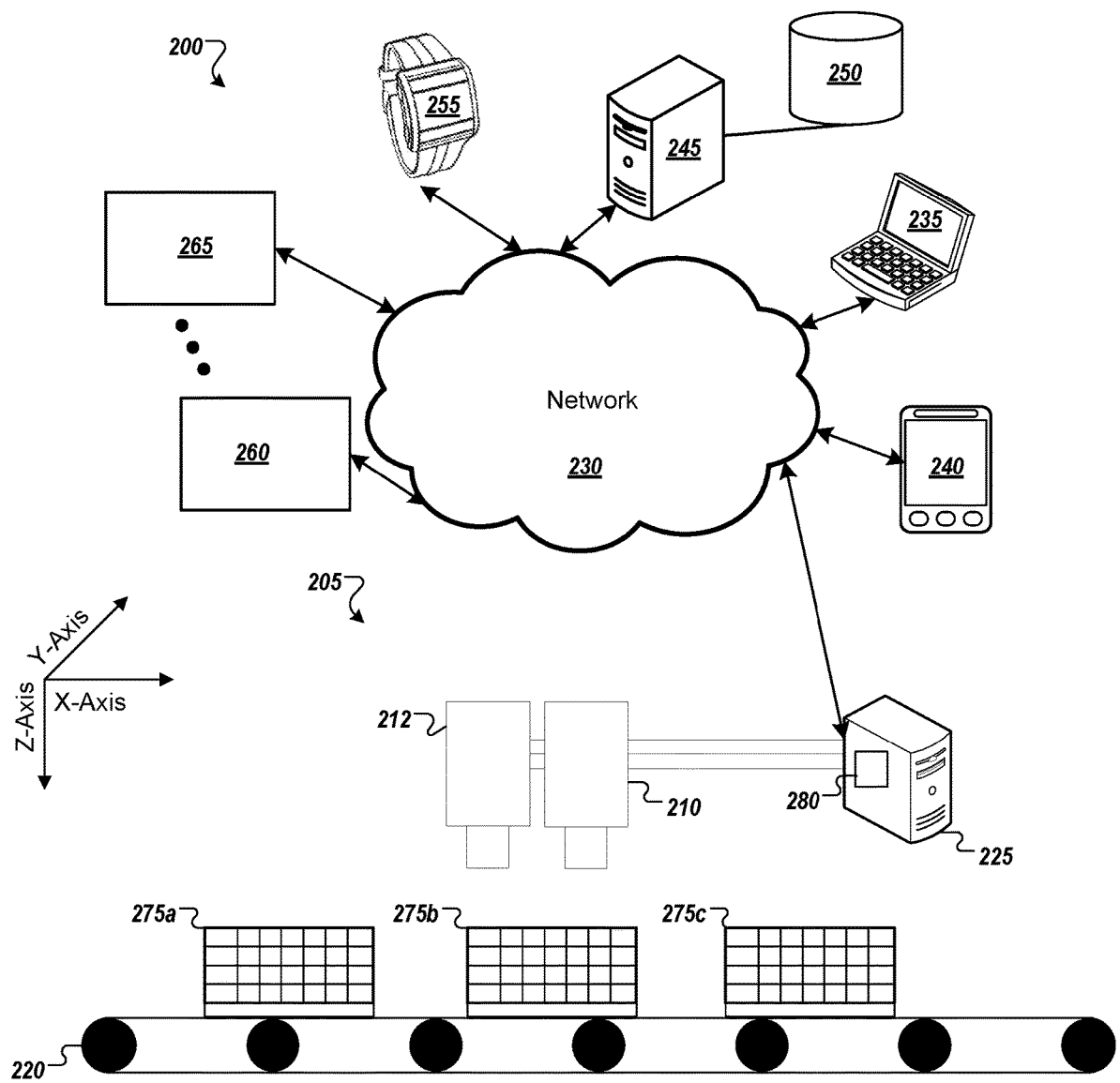
FIG. 2 illustrates a device for detecting object moving along a conveying apparatus according to a first example implementation of the present invention.
Figure 3:
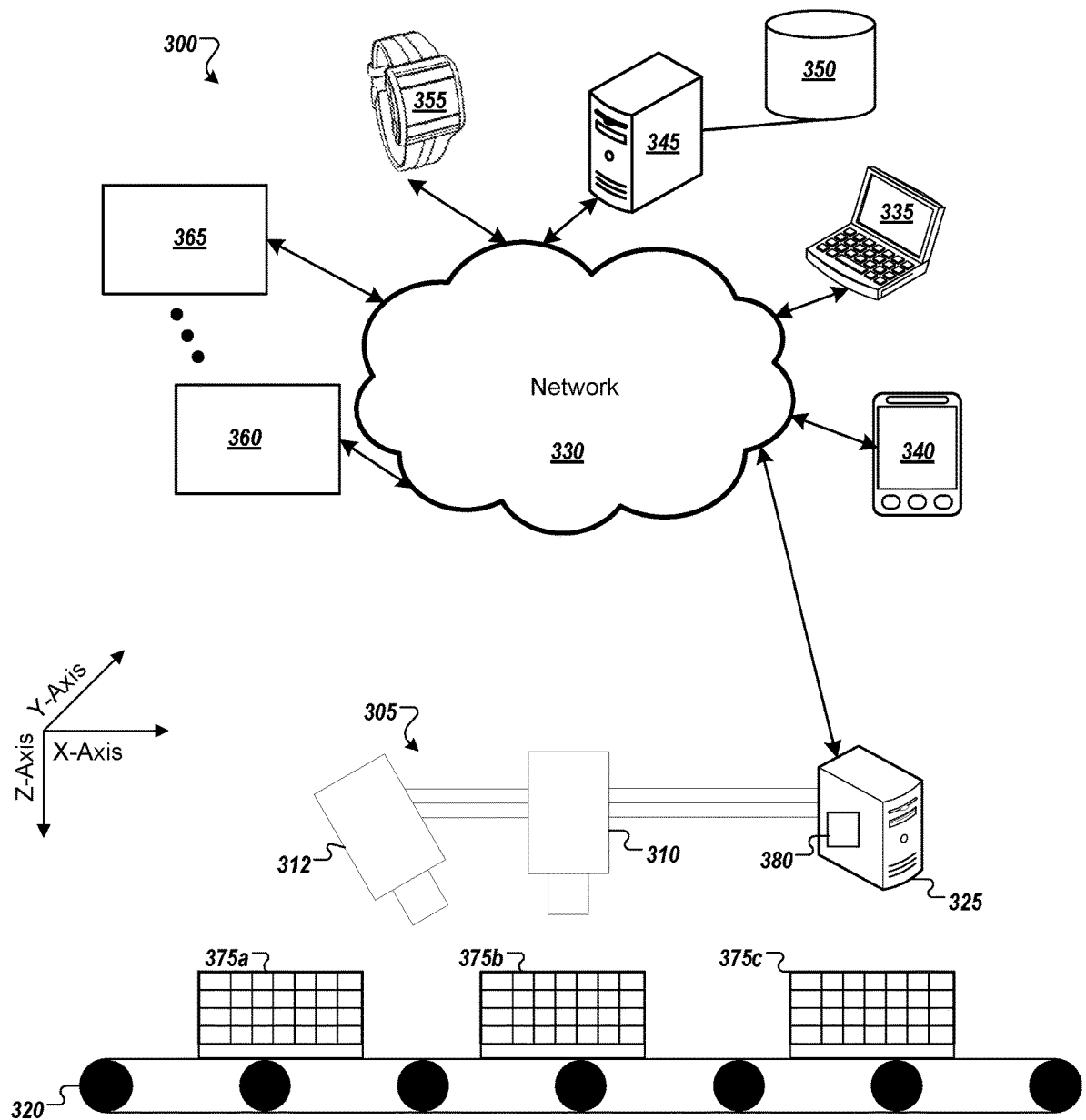
FIG. 3 illustrates a device for detecting object moving along a conveying apparatus according to a second example implementation of the present invention.
Figure 4:
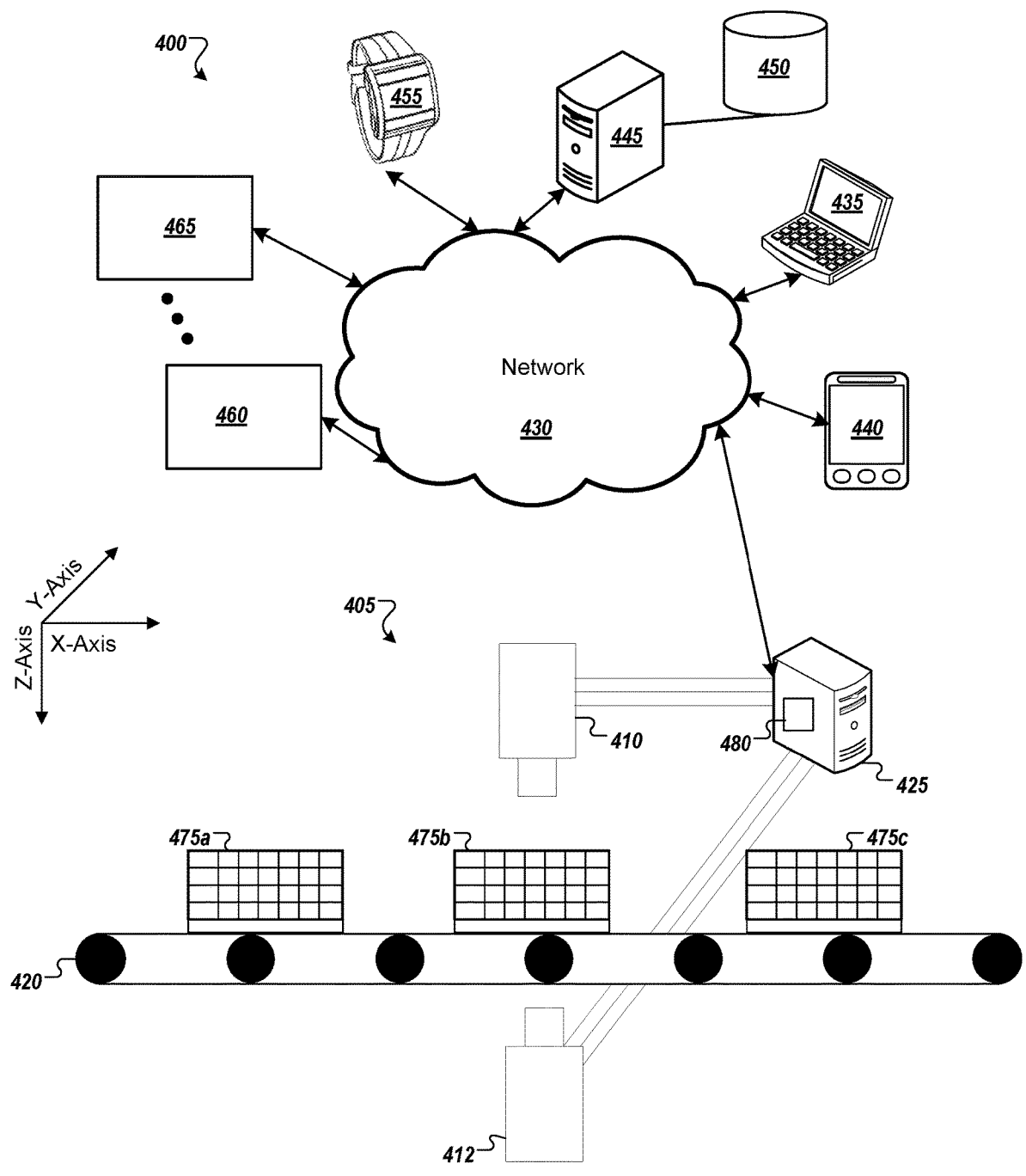
FIG. 4 illustrates a device for detecting object moving along a conveying apparatus according to a third example implementation of the present invention.

FIG. 2 illustrates an apparatus 205 for detecting objects 275a-275c moving along a conveying apparatus 220 according to a first example implementation of the present invention. The apparatus 205 can include two image data capture devices 210/212 located spaced apart from the conveying apparatus 220 along a Z-Axis. As illustrated, the image capture devices 210/212 are aligned in a direction of movement of the objects 275a-275c along the conveying apparatus 220 and are located on the same side of the conveying apparatus 220 as the objects 275a-275c. However, example implementations are not limited to this configuration and may be arranged in other configurations as may be apparent to a person of ordinary skill in the art. Other exemplary configurations are illustrated in FIGS. 3 and 4 discussed below. Further, for illustrative purposes, the apparatus 205 is shown with the objects 275a-275c on the conveying apparatus 220, although it is understood that the objects 275a-275c can be arranged in a different configuration. For example, the objects 275a-275c can be stacked or arranged on a platform, such as a pallet, or inside an object receptacle, such as a cart or bin.

In some example implementations, one or both image data capture devices 210/212 may be two-dimensional imaging devices or cameras, such as color still camera (e.g., a RGB camera), a color video camera, a monochrome or greyscale still camera, a monochrome or greyscale video camera, or any other two-dimensional imaging device that might be apparent to a person of ordinary skill in the art. Additionally, in some example implementations, each of the image data capture devices 210/212 may be a different type of a two-dimensional imaging device (e.g., one image capture device may be an RGB camera and the other image capture device may be a monochrome camera, or any other combination of two-dimensional imaging devices that might be apparent to a person of ordinary skill in the art).

Further, in some example implementations, one or both of the image data capture devices 210/212 may be a three-dimensional image device capable of generating 3D point cloud information, such as an stereo vision camera, a range imaging camera (i.e. time of flight (TOF) camera), or any other device capable of generating 3D point cloud information. Additionally, in some example implementations, each of the image data capture devices 210/212 may be a different type of a three-dimensional imaging device (e.g., one image capture device may be a stereo vision camera and the other image capture device may be a time of flight camera, or any other combination of three-dimensional imaging devices that might be apparent to a person of ordinary skill in the art).

Still further, in some example implementations one of the image capture devices (e.g., device 210) may be a two-dimensional image capture device and the other of the image capture devices (e.g., device 212) may be a three-dimensional image capture device.

As illustrated in FIG. 2, the image capture devices 210/212 may be configured to capture or generate image data of the objects 275a-275c as they pass under the image capture devices 210/212 during travel on the conveying apparatus 220. In some example implementations, the objects 275a-275c may be boxes, packages, or pallets traveling along the conveying apparatus 220 or similar apparatus in an industrial, manufacturing, or sorting facility.

The apparatus 205 may also include a computing device 225 coupled to the image capture devices 210/212 to process image data of the objects 275a-275c. In some example implementations, the computing device 225 may include a system interface 280 (e.g., an Input/Out (I/O) interface) that communicatively couples the image capture devices 210/212 to one or more processors within the computing device 225. For example, a system interface 280 of the computing device 225 may receive image data captured or generated by the image capture devices 210/212 and provide the image data to the one or more processors of the computing device 225.

Further, the one or more processors of the computing device 225 can be configured to detect edges of the objects 275a-275c based on the image data captured or generated by the image capture devices 210/212. As another example, the one or more processors of the computing device 225 can be configured to fuse the edges that were detected in the image data of the image capture devices 210/212 in order to detect gaps between the objects 275a-275c. Processes of detecting and fusing the edges are discussed in greater detail below. In some example implementations, the computing device 225 may be, for example, a computing device 905 of a computing environment 900 of FIG. 9 discussed below. Additionally, the system interface 280 may be, for example, an I/O interface 925 of the computing device 905 of FIG. 9. Further, the one or more processors may be, for example, processor(s) 910 of the computing device 905 of FIG. 9.

The computing device 225 may also generate a combined image signal from the output of the image data capture devices 210/212 to better detect the edges and gaps between the objects 275a-275c. In some example implementations, the computing device 225 may also transmit the combined image signal to a plurality of devices 235-265, communicatively connected to one another via, for example, a network 230 (e.g., by wireline and/or wireless connections), which may use the detected gaps and edges for sorting, tracking, or any other purpose that might be apparent to a person of ordinary skill in the art.

The plurality of devices 235-265 may include, but are not limited to, a computer 235 (e.g., a laptop computing device), mobile devices 240 (e.g., smartphone or tablet), a wearable device 255 (e.g., a smart watch), a server computer 245 connected to a storage device 250 and other computing devices 260-265 that may be apparent to a person of ordinary skill in the art. The devices 235-265 may also have the computing environment 900 as shown below in FIG. 9.

Though in some example implementations, the computing device 225 may generate a combined image signal before transmitting the combined image signal to the plurality of devices 235-265, example implementations of the present invention are not limited to this configuration. For example, the computing device 225 may combine the image data from the image data capture device 210 (which can also be referred to as a first image data capture device 210) with the image data from the image data capture device 212 (which can also be referred to as a second image data capture device 212) to detect edges and gaps relative to the objects 275a-275c to generate the combined image signal using processes or algorithms discussed below.

Conversely, in other example implementations, the computing device 225 may transmit the image data from the image data capture device 210 and the image data from the image data capture device 212 as separate signals to one or more of the plurality of devices 235-265. Once the separate signals are received, each of the plurality of devices 235-265 may combine the separate signals using processes or algorithms discussed below to generate the combined image signal to detect the edges and gaps relative to the objects 275a-275c.

The computing device 225 may determine whether to transmit the combined image signal or separate signals corresponding to the image data from the image data capture device 210 and the image data from the image data capture device 212 to generate the combined image signal during an initial setup or reconfigurable setting of the apparatus 205. The determination of whether to transmit the combined image signal or the separate signals may be based on querying each of the plurality of devices 235-265 to determine capabilities of each of the plurality of devices 235-265 and the bandwidth available for data transfer to each of the plurality of devices 235-265.

FIG. 3 illustrates an apparatus 305 for detecting objects 375a-375c moving along a conveying apparatus 320 according to a second example implementation of the present invention. The apparatus 305 is similar to the apparatus 205 illustrated in FIG. 2 and described above. Thus, similar reference numerals are used to illustrate similar structures and components.

The apparatus 305 includes two image data capture devices 310/312 located spaced apart from the conveying apparatus 320 along a Z-Axis. However, unlike FIG. 2, the image capture devices 310/312 are illustrated as being angled relative to each other while also being located on the same side of conveying apparatus 320 as the objects 375a-375c. Again, example implementations are not limited to this configuration and may be arranged in other configurations as may be apparent to a person of ordinary skill in the art. Other exemplary configurations are illustrated in FIG. 4 discussed below.

In some example implementations, one or both of the image data capture devices 310/312 may be two-dimensional imaging devices or cameras, such as color still camera (e.g., a RGB camera), a color video camera, a monochrome or greyscale still camera, a monochrome or greyscale video camera or any other two-dimensional imaging device that might be apparent to a person of ordinary skill in the art. Additionally, in some example implementations, each of the image data capture devices 310/312 may be a different type of a two-dimensional imaging device (e.g., one image capture device may be an RGB camera and the other image capture device may be a monochrome camera, or any other combination of two-dimensional imaging devices that might be apparent to a person of ordinary skill in the art).

Further, in some example implementations, one or both of the image data capture devices 310/312 may be a three-dimensional image device capable of capturing 3D point clouds such as a stereo vision camera, a time of flight (TOF)

camera, or any other device capable of capturing a 3D point cloud. Additionally, in some example implementations, each of the image data capture devices 310/312 may be a different type of a three-dimensional imaging device (e.g., one image capture device may be a stereo vision camera and the other image capture device may be a time of flight camera, or any other combination of three-dimensional imaging devices that might be apparent to a person of ordinary skill in the art).

Still further, in some example implementations one of the image capture devices (e.g., device 310) may be a two-dimensional capture device and the other of the image capture devices (e.g., device 312) may be a three-dimensional capture device.

The image capture devices 310/312 may be configured to capture image data of the objects 375a-375c that pass under the image capture devices 310/312 during travel on a conveying apparatus 320. In some example implementations, the objects 375a-375c may be boxes, packages, or pallets traveling along a conveyor belt or similar apparatus in an industrial, manufacturing, or sorting facility.

The apparatus 305 may also include a computing device 325 coupled to the image capture devices 310/312 to process image data of the objects 375a-375c. In some example implementations, the computing device 325 may include a system interface 380 (e.g., an I/O interface) that communicatively couples the image capture devices 310/312 to one or more processors within the computing device 325. For example, a system interface 380 of the computing device 325 may receive image data captured or generated by the image capture devices 310/312 and provide the image data to the one or more processors of the computing device 325.

The one or more processors of the computing device 325 can be configured to detect edges of the objects 375a-375c and fuse the detected edges in order to detect gaps between the objects 375a-375c. Processes of detecting and fusing the edges are discussed in greater detail below. In some example implementations, the computing device 325 may be, for example, the computing device 905 of the computing environment 900 of FIG. 9 discussed below. Additionally, the system interface 380 may be, for example, an I/O interface 925 of the computing device 905 of FIG. 9. Further, the one or more processors may be, for example, processor(s) 910 of the computing device 905 of FIG. 9.

The computing device 325 may also generate a combined image signal from the output of the image data capture devices 310/312 to better detect the edges and gaps between the objects 375a-375c. In some example implementations, the computing device 325 may also transmit the combined image signal to a plurality of devices 335-365, communicatively connected to one another via, for example, a network 330 (e.g., by wireline and/or wireless connections), which may use the detected gaps and edges for sorting, tracking, or any other purpose that might be apparent to a person of ordinary skill in the art.

The plurality of devices 335-365 may include, but are not limited to, a computer 335 (e.g., a laptop computing device), mobile devices 340 (e.g., smartphone or tablet), a wearable device 355 (e.g., a smart watch), a server computer 345 connected to a storage device 350 and other computing devices 360-365 that may be apparent to a person of ordinary skill in the art. The devices 335-365 may also have the computing environment 900 as shown below in FIG. 9.

Though in some example implementations, the computing device 325 may generate a combined image signal before transmitting the combined image signal to the plurality of devices 335-365, example implementations of the present invention are not limited to this configuration. For example, the computing device 325 may combine the image data from the image data capture device 310 (which can also be referred to as a first image data capture device 310) with the image data from the image data capture device 312 (which can also be referred to as a second image data capture device 312) to detect edges and gaps relative to the objects 375a-375c to generate the combined image signal using processes or algorithms discussed below.

Conversely, in other example implementations, the computing device 325 may transmit the image data from the image data capture device 310 and the image data from the image data capture device 312 as separate signals to one or more of the plurality of devices 335-365. Once the separate signals are received, each of the plurality of devices 335-365 may combine the separate signals using processes or algorithms discussed below to generate the combined image signal to detect the edges and gaps relative to the objects 375a-375c.

The computing device 325 may determine whether to transmit the combined image signal or separate signals corresponding to the image data from the image data capture device 310 and the image data from the image data capture device 312 to generate the combined image signal during an initial setup or reconfigurable setting of the apparatus 305. The determination of whether to transmit the combined image signal or the separate signals may be based on querying each of the plurality of devices 335-365 to determine capabilities of each of the plurality of devices 335-365 and the bandwidth available for data transfer to each of the plurality of devices 335-365.

FIG. 4 illustrates an apparatus 405 for detecting objects 475a-475c moving along a conveying apparatus 420 according to a third example implementation of the present invention. The apparatus 405 is similar to the apparatus 205 illustrated in FIG. 2 and described above. Thus, similar reference numerals are used to illustrate similar structures and components.

The apparatus 405 includes two image data capture devices 410/412 located spaced apart from the conveying apparatus along a Z-Axis. However, unlike FIG. 2, the image capture devices 410/412 are illustrated as aligned on one or more of an X-Axis, Y-Axis, or Z-Axis while also being located on the different sides of the objects 475a-475c, and more specifically, opposite sides of a conveying apparatus 420. Again, example implementations are not limited to this configuration and may be arranged in other configurations as may be apparent to a person of ordinary skill in the art.

In some example implementations, one or both image data capture devices 410/412 may be two-dimensional imaging devices or cameras, such as color still camera (e.g., a RGB camera), a color video camera, a monochrome or greyscale still camera, a monochrome or greyscale video camera or any other two-dimensional imaging device that might be apparent to a person of ordinary skill in the art. Additionally, in some example implementations, each of the image data capture devices 410/412 may be a different type of a two-dimensional imaging device (e.g., one image capture device may be an RGB camera and the other image capture device may be a monochrome camera, or any other combination of two-dimensional imaging devices that might be apparent to a person of ordinary skill in the art).

Further, in some example implementations, one or both of the image data capture devices 410/412 may be a three-dimensional image device capable of capturing 3D point clouds such as a stereo vision camera, a time of flight (TOF)

camera, or any other device capable of capturing a 3D point cloud. Additionally, in some example implementations, each of the image data capture devices 410/412 may be a different type of a three-dimensional imaging device (e.g., one image capture device may be a stereo vision camera and the other image capture device may be a time of flight camera, or any other combination of three-dimensional imaging devices that might be apparent to a person of ordinary skill in the art).

Still further, in some example implementations one of the image capture devices (e.g., device 410) may be a two-dimensional capture device and the other of the image capture devices (e.g., device 412) may be a three-dimensional capture device.

The image capture devices 410/412 may be configured to capture image data of the objects 475a-475c that pass under the image capture devices 410/412 during travel on the conveying apparatus 420. In some example implementations, the objects 475a-475c may be boxes, packages, or pallets traveling along a conveyor belt or similar apparatus in an industrial, manufacturing, or sorting facility.

The apparatus 405 may also include a computing device 425 coupled to the image capture devices 410/412 to process image data of the objects 475a-475c. In some example implementations, the computing device 425 may include a system interface 480 (e.g., an I/O interface) that communicatively couples the image capture devices 410/412 to one or more processors within the computing device 425. For example, a system interface 480 of the computing device 425 may receive image data captured or generated by the image capture devices 410/412 and provide the image data to the one or more processors of the computing device 425.

The one or more processors of the computing device 425 can be configured to detect edges of the objects and fuse the edges in order to detect gaps between the objects 475a-475c. Processes of detecting and fusing the edges are discussed in greater detail below. In some example implementations, the computing device 425 may be, for example, the computing device 905 of the computing environment 900 of FIG. 9 discussed below. Additionally, the system interface 480 may be, for example, an I/O interface 925 of the computing device 905 of FIG. 9. Further, the one or more processors may be, for example, processor(s) 910 of the computing device 905 of FIG. 9.

The computing device 425 may also generate a combined image signal from the output of the image data capture devices 410/412 to better detect the edges and gaps between the objects 475a-475c. In some example implementations, the computing device 425 may also transmit the combined image signal to a plurality of devices 435-465, communicatively connected to one another via, for example, a network 430 (e.g., by wireline and/or wireless connections), which may use the detected gaps and edges for sorting, tracking, or any other purpose that might be apparent to a person of ordinary skill in the art.

The plurality of devices 435-465 may include, but are not limited to, a computer 435 (e.g., a laptop computing device), mobile devices 440 (e.g., smartphone or tablet), a wearable device 455 (e.g., a smart watch), a server computer 445 connected to a storage device 450 and other computing devices 460-465 that may be apparent to a person of ordinary skill in the art. The devices 435-465 may also have the computing environment 900 as shown below in FIG. 9.

Though in some example implementations the computing device 425 may generate a combined image signal before transmitting the combined image signal to the plurality of devices 435-465, example implementations of the present invention are not limited to this configuration. For example, the computing device 425 may combine the image data from the image data capture device 410 (which can also be referred to as the first image capture device 410) with the image data from the image data capture device 412 (which can also be referred to as the second image capture device 412) to detect edges and gaps relative to the objects 475a-475c to generate the combined image signal using processes or algorithms discussed below.

Conversely, in other example implementations, the computing device 425 may transmit the image data from the image data capture device 410 and the image data from the image data capture device 412 as separate signals to one or more of the plurality of devices 435-465. Once the separate signals are received, each of the plurality of devices 435-465 may combine the separate signals using processes or algorithms discussed below to generate the combined image signal to detect the edges and gaps relative to the objects 475a-475c.

The computing device 425 may determine whether to transmit the combined image signal or separate signals corresponding to the image data from the image data capture device 410 and the image data from the image data capture device 412 to generate the combined image signal during an initial setup or reconfigurable setting of the apparatus 405. The determination of whether to transmit the combined image signal or the separate signals may be based on querying each of the plurality of devices 435-465 to determine capabilities of each of the plurality of devices 435-465 and the bandwidth available for data transfer to each of the plurality of devices 435-465.

Figure 5:
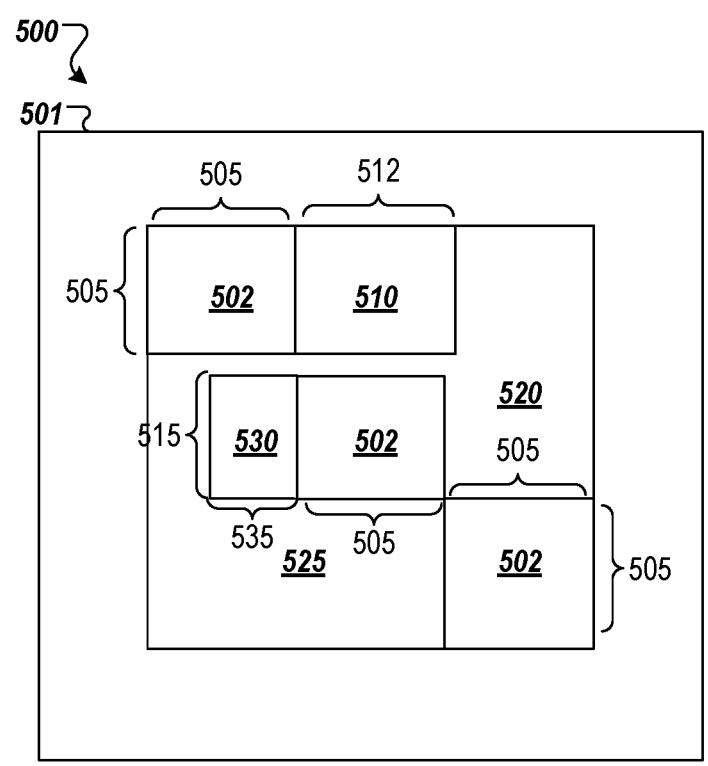
FIG. 5 illustrates a schematic view of image data that can be representative of edge detection results of a single image capture device or camera in accordance with a comparative example.

FIG. 5 illustrates a schematic view 500 of image data that can be representative of edge detection results of a single image capture device or camera in accordance with a comparative example. As illustrated, the edge detection results of the image data may include a plurality of rectangles 502, 510, and 530 of different sizes graphically representing boxes or objects of generally the same size on a pallet 501. In other words, the image data of FIG. 5 illustrates that the rectangles 502, 510 and 530 have different sizes indicating that the system is detecting the objects or boxes represented by each rectangle having different sizes from one another. However, in reality the actual boxes or objects being imaged by the image capture device, which the system is attempting to represent by the rectangles 502, 510, 530, are of generally similar size and shape in this example. In other words, the system is erroneously detecting the boxes as having different shapes and sizes when the boxes actually have generally similar size and shape Each box or object has a detected shape defined by edges (e.g., the lines and curves representing edges defining the shape of the object) detected in the image data. In FIG. 5, the edges of the boxes or objects detected by the single image capture device are illustrated as straight lines represented by reference numerals 505, 512, 515 and 535 that form the sides of the rectangles 502, 510 and 530. However, detected edges may not be straight lines and may also be curves or irregular shapes.

As illustrated, line 505 (representing a detected edge) has been detected as having a first length and line 512 (representing another detected edge) has been detected as having a second length longer than that of line 505. Further, lines 515 and 535 (each representing detected edges) have been detected as having shorter lengths relative to the detected edges represented by lines 505 and 512. In this example, no additional internal edges (e.g., edges between objects or boxes represented in the image data) have been detected in regions 520 and 525, though internal edges may be present for the actual boxes or objects that exist in regions 520 and 525. Example implementations may fuse edges or contours detected from different modes of image data using process 800 described with respect to FIG. 8 below to address errors in contour detection (e.g., undetected internal edges, detected edges having lengths longer or shorter than actual edges of objects, or any other detection errors that might be apparent to a person of ordinary skill in the art).

Figure 6:
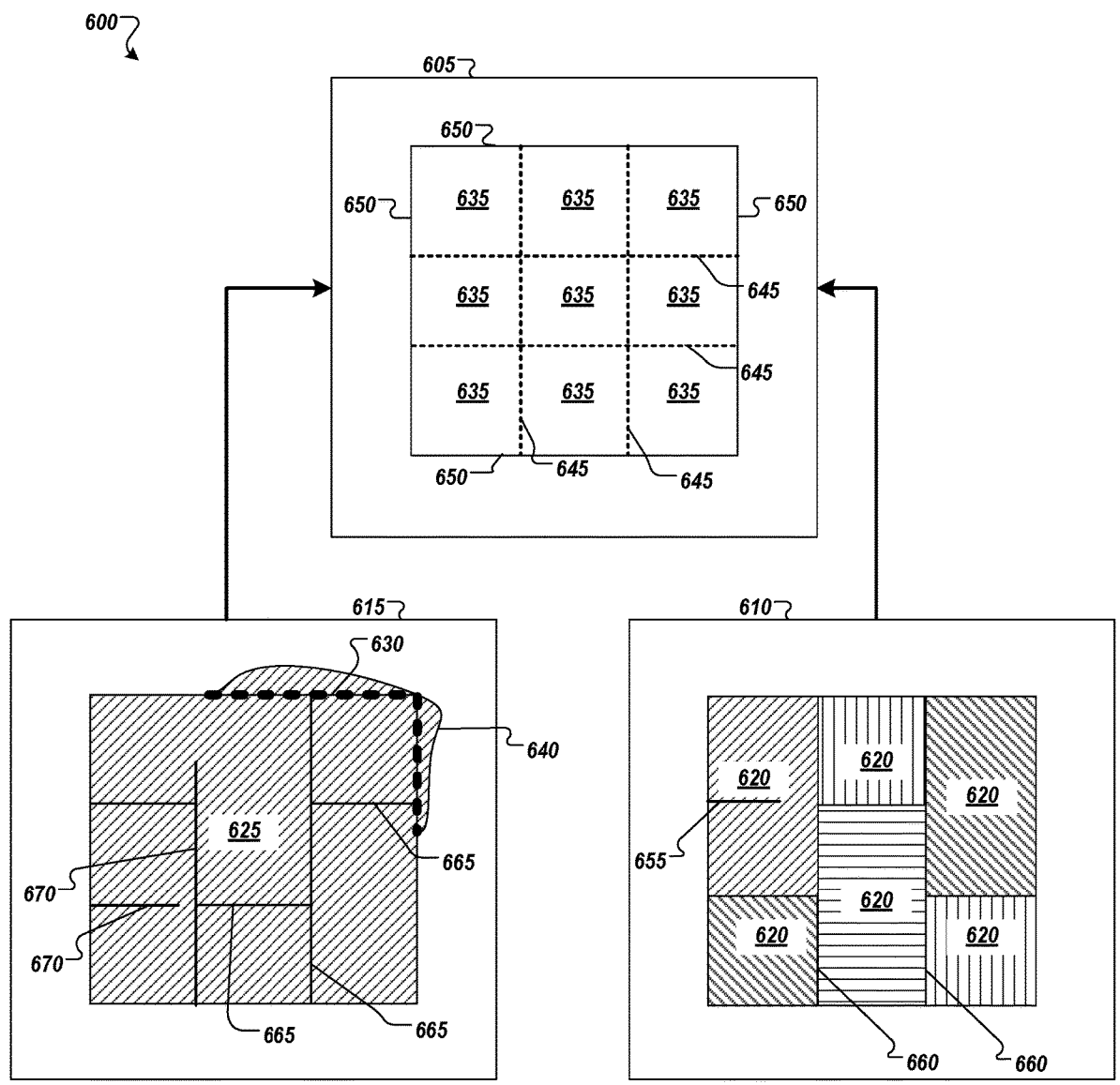
FIG. 6 illustrates a schematic view of a fused image data representation that can be representative of fused edge detection results using as an example implementation of the present invention.

FIG. 6 illustrates a schematic view 600 of a fused image data representation that can represent fused edge detection results as an example implementation of the present invention. As illustrated, two different image data representations (e.g., first image data representation 610 and second image data representation 615) may be merged into a fused image data representation 605 representative fused image data that correspond to the fused edges or contours of the detected objects.

For example, the first image data representation 610 may be visual representations of image data captured using 2D image data, such as a monochrome camera image data. In some cases, a 2D image capture device (e.g., a 2D image camera) may not have a resolution sufficient to determine contrast between different objects, such as boxes. If the resolution of the 2D image capture device does not have sufficient resolution to determine contrast between different boxes, some part of the edges (e.g., internal edges between adjacent boxes) may not be detected, resulting in inaccurate detected edges, such as the line 655, while other edges may be accurately detected, as represented by lines 660. In FIG. 6, areas representing detected objects based on inaccurate detected edges have been illustrated by the hatched lines in the regions 620. By itself, the first image data representation 610 may be considered a detection failure because the internal edges between the boxes in the areas of inaccurate detected edges (e.g., hatched lines in the regions 620) may not have been accurately detected. However, as explained below, when the first image data representation 610 combined with the second image data representation 615, the fused image data representation 605 may be generated.

As an example, the second image data representation 615 may be visual representations of 3D Point cloud data (also referred to as 3D image data) generated by a 3D camera (e.g., a depth perception camera). The hatched area in region 625 may be representative of the 3D point cloud data. Though portions of the 3D point cloud may be representative of the height of the boxes or objects in the region 625, edges of the periphery of the objects may be distorted or not fully represented, which can be due to noise or environmental factors, as indicated by the determined contour line 640 compared to the actual edge as illustrated by the broken line 630. In some cases, edge detection based on processing and/or analysis of the 3D image data can accurately detect edges as represented by lines 665, while in other cases, edge detection based on processing and/or analysis of the 3D image data may generate incomplete or inaccurate edge detections, as represented by lines 670. Again, by itself, some of the detected edges based on second image data representation 615 may also be considered a detection failure because some of the internal edges (i.e. lines 670) and the edges of the periphery of the objects may be distorted, incomplete, and/or inaccurate (as shown by the difference between the determined contour line 640 and the actual edge illustrated by the broken line 630).

By fusing image data (representing 2D image data), as illustrated by first image data representation 610, with second image data representation 615 (representing 3D depth camera data), as illustrated by first image data representation 610, the fused image data, as illustrated by image data representation 605, may be generated. As illustrated, the fused image data representation 605 may allow nine distinct objects 635 to be detected based on an increased detection accuracy of internal contours or edges 645 and peripheral contours or edges 650, which can be determined by fusing partially detected, inaccurate, or incomplete detected edges, such as the detected edges represented by lines 670 and 655 with one another and/or by a combination accurately detected edges (i.e. edges with a high degree of detection confidence, such as external edges), such as the detected edges represented by lines 66- and 665, with one or more of the partially detected, inaccurate, or incomplete detected edges.

Thus, edge fusion using processes in accordance with example implementations of the present invention may allow the fused image data representation 605 to be generated from a pair of the first image data representation 610 and second image data representation 615, which would each otherwise lead to an object detection hypothesis that may be considered inaccurate or of low confidence.

Figure 7A:
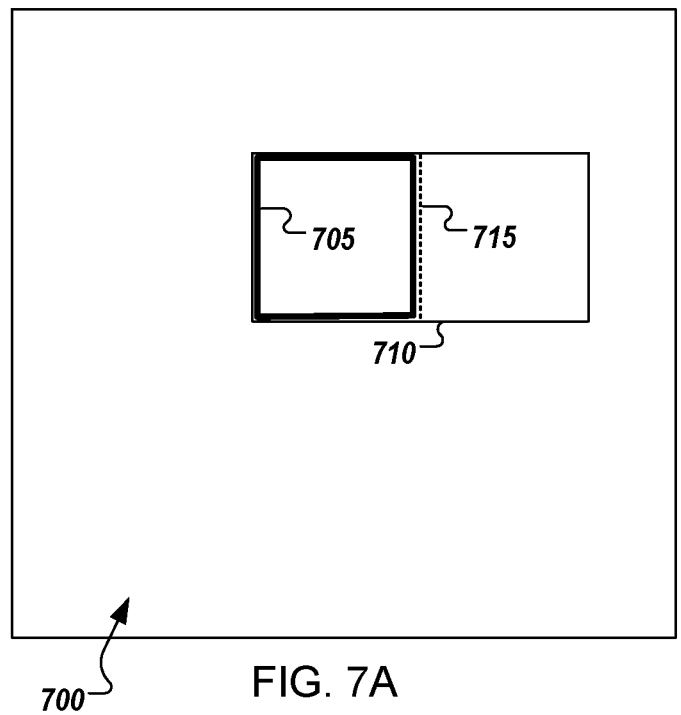
FIGS. 7A and 7B illustrate schematic representations of an inaccurate detection hypothesizes that may be avoided by utilizing the fused detected edge data in accordance with example implementations of the present invention.
Figure 7B:
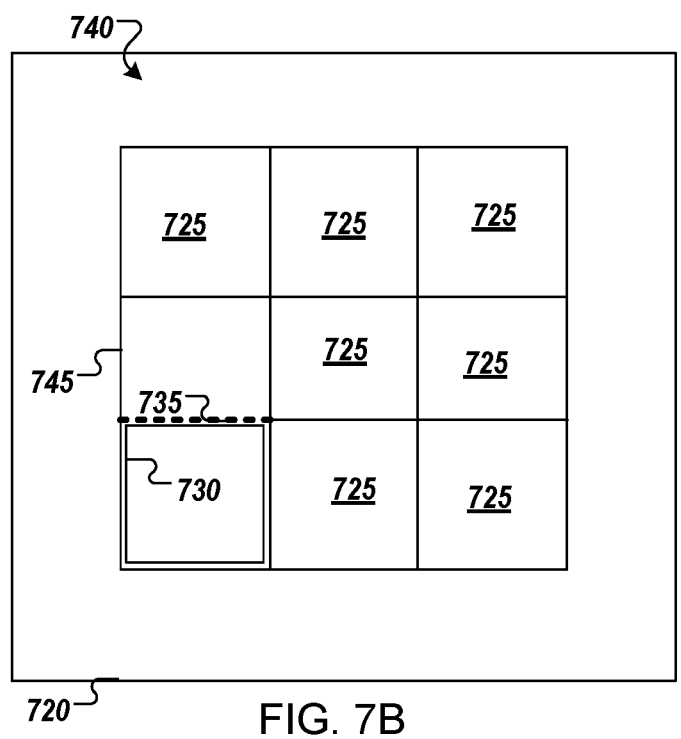

FIGS. 7A and 7B illustrate schematic representations of object detection in accordance with example implementations of the present invention. The robotic system 100 of FIG. 1 may generate an object detection hypothesis as described below with respect to step 820 in process 800 of FIG. 8. Once the object detection hypothesis has been determined as described with reference to step 820, the object detection hypothesis can be validated as described below with respect to step 825 of process 800 in FIG. 8. By using the fused image data, improved generation of the object detection hypothesis and validation thereof may be achieved.

FIG. 7A illustrates a first example of an inaccurate detection hypothesis that may be avoided by utilizing the fused edge data representations in accordance with example implementations of the present invention. As illustrated in FIG. 7A, in some cases, the internal contour or edge (e.g., the contour or edge between two boxes) represented by broken line 715 may not be detected based on analysis of the edge detection data represented by the rectangle 710 from a single mode of image capture, and the robotic system 100 may not be able to accurately generate the detection hypothesis for the actual object represented by square 705. As a result, the robotic system 100 may erroneously generate the detection hypothesis as the rectangle 710. As fusion of edge detection data associated with different modes of image data may improve the certainty of edge information and/or identify edges that would otherwise not be considered as a valid edge detection result for the contours of the object, the robotic system 100 can improved generation and/or validation of the detection hypothesis.

FIG. 7B illustrates a second example of an inaccurate detection hypothesis that may be avoided by utilizing the fused detected edge data in accordance with example implementations of the present invention. As illustrated, a series of boxes 725 on a pallet 720 may be detected. Additionally, the detection hypothesis (represented by square 745) may be generated based on image information representing an input image 740. However, in some cases, the robotic system 100 may not detect the dividing contour (e.g., an internal contour or edge between two boxes) represented by broken line 735 by edge detection based on a single mode of image capture, and instead, may erroneously generate the detection hypothesis represented by rectangle 745. In other words, the failure to recognize the edge or contour (e.g., internal edge between two boxes) represented by broken line 735 may result in an object detection hypothesis that is erroneous or inaccurate. As fusion of the edge detection data associated with different modes of image data may better allow detection of the contours of the object, improved generation and/or validation of the object detection hypothesis may be achieved.

Figure 8:
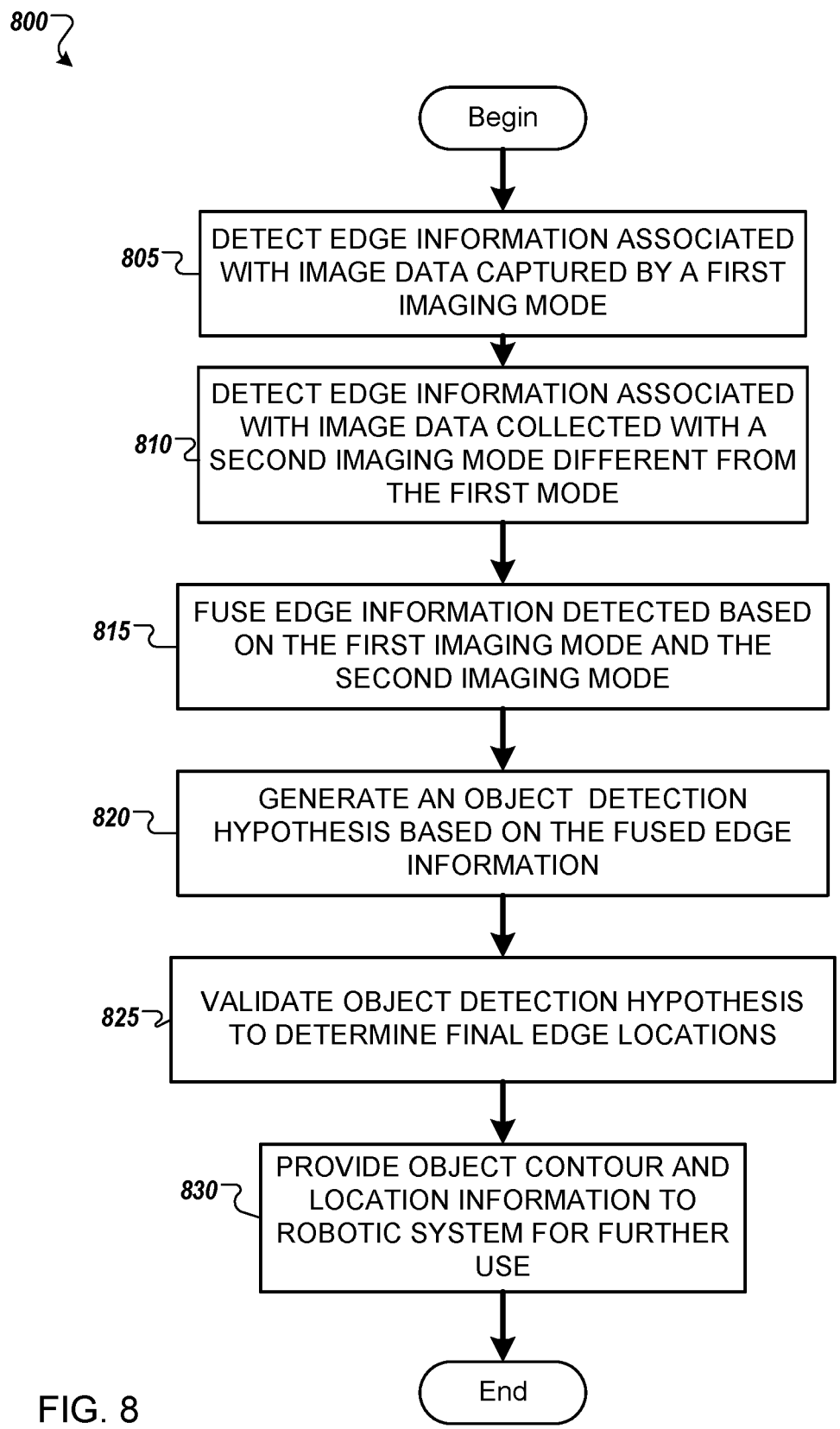
FIG. 8 illustrates a flow chart of a process for object detection and validation in accordance with example implementations of the present invention.

FIG. 8 illustrates a flow chart of a process 800 for object detection and validation in accordance with example implementations of the present invention. The process 800 may be performed by a computing device (such as computing device 905 of the computing environment 900 illustrated in FIG. 9 and discussed below) of the robotic system 100.

As illustrated in FIG. 8, the process 800 begins with detection of edge information associated with image data captured by a first imaging mode at step 805. Edge information is information defining and/or describing the contours of one or more objects captured in the image data. As discussed above, the edges of an object can be lines and/or curves representing the edges that define the shape of an object. The edge information may include edge dimensions (e.g., edge lengths), edge shapes (e.g., straight line, curved etc.), edge locations, and corner locations (e.g., locations where two or more edges meet). For example, the edge information can be coordinate information (i.e. the (x, y) coordinates) corresponding to the position of one or more pixels that form the detected edge in the image data. The edge information may also include height or depth information (e.g., information representing a distance between the image capture device and a point on a surface) and locations of regions with similar height. As an example, the depth information can include a value that represents distance from the image capture device (i.e. 3D camera). In some embodiments, the depth information can be depth values assigned to the pixels in the image data.

If multiple objects are captured in the image data, the image data may include external or peripheral contours or edges located on the periphery of a collection of multiple objects captured in the image data. For example, peripheral edges or contours can be represented by reference numeral 650 in the fused image data representation 605 of FIG. 6. Further, the image data may include internal contours or edges located between adjacent objects. As an example, the internal contours or edges for boxes can be perpendicular the peripheral edges or contours. Further, for example, internal contours or edges can be represented by reference numeral 645 in the fused image data representation 605 of FIG. 6.

The first imaging mode (e.g., first mode of image capture) can be a process for capturing or generating the image data. In some example implementations, the first imaging mode may be a process of capturing a 2D image data in order to produce an image data representation as exemplified by the first image data representation 610 discussed above with respect to FIG. 6. In other words, in some example implementations, edge information detection of the first imaging mode may be done based on two-dimensional image data, such as data from a monochrome camera (e.g., grey-scale camera), a color camera (e.g., a Red-Green-Blue (RGB) camera), or any other two-dimensional camera that might be apparent to a person of ordinary skill in the art.

With respect to two-dimensional image data, the edge detection may be performed using any type of 2D edge detection algorithm that might be apparent to a person of ordinary skill in the art. For example, methods of 2D edge detection can be CANNY Edge Detection, Region Similarity Edge Detection (RSD), Line Segment Detection (LSS), or any other 2D edge detection methodology may be used to detect object contours to extract the edge information.

In other example implementations, the first imaging mode may be a process of capturing 3D point cloud data to produce an image data representation as exemplified by the second image data representation 615 discussed above with respect to FIG. 6. In other words, in some example implementations, the edge information detection of the first imaging mode may be done based on three-dimensional data, such as data from a stereo vision camera, a range imaging camera (e.g. time of flight (TOF) camera), or any other three-dimensional camera that might be apparent to a person of ordinary skill in the art.

With respect to three-dimensional image data (e.g., 3D point cloud data), the 3D point cloud can be a projection of points in an image space representing the objects. The object contours or edges can then be identified from the 3D point cloud. For example, the robotic system 200 can identify the object contours or edges from the projected 3D point cloud based on a change or difference in the depth information between one position in the 3D point cloud and an adjacent position in the 3D point cloud.

At step 810, the edge information associated with image data collected with a second imaging mode is detected. As discussed in greater detail below, the second imaging mode is different from the first imaging mode associated with the edge information detection of step 805.

As explained above, the edge information is information defining the contours of one or more objects captured in the image data. As discussed above, the contours of an object are lines and/or curves representing the edges that define the shape of an object. Again, the edge information may include edge dimensions (e.g., edge lengths), edge shapes (e.g., straight line, curved etc.), edge locations, and corner locations (e.g., locations where two or more edges meet). The edge information may also include height or depth information (e.g., information representing a distance between the image capture device and a point on a surface) and locations of regions with similar height. The contours may include external or peripheral contours or edges located on the periphery of a collection of multiple objects captured in the image data. For example, peripheral edges or contours can be represented by reference numeral 650 in the fused image data representation 605 of FIG. 6. Further, the image data may include internal contours or edges located between adjacent objects. As an example, the internal contours or edges for boxes can be perpendicular the peripheral edges or contours. Further, for example, internal contours or edges can be represented by reference numeral 645 were represented by reference numeral 650 in the fused image data representation 605 of FIG. 6.

The second imaging mode (e.g., second mode of image capture) can also be a process for capturing or generating the image data. In some example implementations, the second imaging mode may be a process of capturing 2D image data in order to produce an image data representation as exemplified by the first image data representation 610 discussed above with respect to FIG. 6. In other words, in some example implementations, edge information detection of the second imaging mode may be done based on two-dimensional image data, such as data from a monochrome camera (e.g., grey-scale camera), a color camera (e.g., a RGB camera), or any other two-dimensional camera that might be apparent to a person of ordinary skill in the art.

With respect to two-dimensional image data, the edge detection may be performed using any type of 2D edge detection algorithm that might be apparent to a person of ordinary skill in the art. For example, methods of 2D edge detection can be CANNY Edge Detection, Region Similarity Edge Detection (RSD), Line Segment Detection (LSS), or any other 2D edge detection methodology may be used to detect object contours to extract edge information.

In other example implementations, the second imaging mode may be a process of capturing 3D point cloud data to produce an image data representation as exemplified by the second image data representation 615 discussed above with respect to FIG. 6. In other words, in some example implementations, the edge information detection of the second imaging mode may be done based on three-dimensional data, such as data from a stereo vision camera, a range imaging camera (e.g., time of flight (TOF) camera), or any other three-dimensional camera that might be apparent to a person of ordinary skill in the art.

With respect to three-dimensional image data (e.g., 3D point cloud data), the 3D point cloud can be a projection of points in an image space representing the objects. The object contours or edges can then be identified from the 3D point cloud. For example, the robotic system 200 can identify the object contours or edges from the projected 3D point cloud based on a change or difference in the depth information between one position in the 3D point cloud and an adjacent position in the 3D point cloud.

The second imaging mode (e.g., second mode of image capture) is a different type of mode of image capture compared to the first imaging mode. For example, if the edge detection associated with the first imaging mode was done based on two-dimensional data, edge information may be detected at step 810 based on three-dimensional data, or a different type of two-dimensional data (e.g., a monochrome camera, if color camera was used at step 805, or color camera, if monochrome camera data was used at step 805).

Conversely, if the edge detection associated with the first imaging mode was done based on three-dimensional data, edge information may be detected at step 810 based on two-dimensional data, or a different type of three-dimensional data (e.g., a stereo vision camera if a TOF camera was used at step 805 or a TOF camera if a stereo vision camera was used at step 805).

At step 815, the edge information detected from the data associated with the first imaging mode and the second imaging mode is combined to generate fused edge information using a fusion process. Specifically, the edges detected based on the first imaging mode and the second imaging mode are combined into a "standard" camera space. In other words, edges detected based on each of the first imaging mode and the second imaging mode are transformed from the native camera space (e.g., the coordinate system) associated with each imaging mode into a common or shared camera space (e.g., the standard camera space) as discussed in greater detail below. Example implementations of the standard camera space may include a 3D camera space, such as the camera space for the stereo vision camera or the ToF camera.

In some example implementations, the detected edges from the two-dimensional image data (e.g., from a 2D imaging mode) may be projected into a three-dimensional camera space using the depth information for a two dimensional plane or surface, which may define edge height, captured adjacent the detected edges of the 2D image. Further, in some example implementations, three-dimensional space data may be transformed into a different mode of three-dimensional space data (e.g., image data from a ToF camera may be transformed into image data from a stereo vision camera).

In other words, the fusion process may be performed by generating projected edge points (e.g., coordinates or locations of points along the detected edges) associated with one of the modes of image data into a common image space (e.g., a "standard" camera space). More specifically, the detected edges from one of the modes of image data may be projected (or mapped) into the common image space of a selected camera or imaging device (also referred to as the selected standard camera space), which can be, for example the stereo vision camera space). During the fusion process, the robotic system 100 can account for and correct possible inaccuracies of the coordinates of edge points after the transformation and projection due to factors such as point cloud noise or calibration (e.g., physical offset/angle/distance between the cameras).

For the detected edges in the image space of the selected standard camera (e.g., the stereo vision camera), the projection may be performed by using the original position information (i.e. the coordinates) of the detected edges for the standard camera. In other words, the robotic system 100 does need to perform projection of the detected edges from the selected standard camera to the common image space. In some example implementations, the selected standard camera may be associated with the first imaging mode. In other example implementations, the selected camera may be associated with the second imaging mode.

For detected edges in the image spaces of other cameras (e.g., the camera having a native image space different from the selected "standard" camera space), several different steps may be performed depending on the type of camera.

In the case of the other imaging mode being a 2D camera, edge points, which are the points that form the detected edges, detected from 2D image data of the 2D camera (also referred to as 2D edge points) may be assigned depth values by projecting the 2D edge points onto the selected camera image space, which in this case is a 3D image space, of the selected standard camera using the depth information from the selected standard camera that correspond to the projected 2D points. In other words, the depth values for points (i.e. pixels) from the selected standard camera image space (e.g., the stereo vision camera) corresponding with 2D locations (e.g., the (x, y) pixel coordinates at which the edge points for the detected edges are located in the 2D image space for the 2D camera) are used to project the 2D edge points into the 3D image space of the selected standard camera. This can generate projected 3D edge points from the 2D edge points.

Further, the edge points captured by the other camera (e.g., the camera having a native image space different from the selected standard image space) can be transformed to the selected standard image space (also referred to as "transformed edge points"). The transformed edge points may be generated from the projected 2D edge points described in the preceding paragraph or may be from another 3D camera that is different from the selected standard camera or imaging device. For example, the transformed edge points generated from the projected 2D edge points may be transformed to the 3D space of the selected standard camera such that the transformed edge points can be considered as if they are also part of the original image data of the selected standard camera. The transformation of the edge points of one camera to the selected standard camera may include translation or shifting of the position of the projected 3D edge points, and/or scaling of the projected 3D edge points to conform the projected 3D edge points to the standard camera image space of the selected camera.

Once the projected 3D edge points have been translated into the selected standard camera image space, the computing system 100 may generate a 2D representation (also referred to as a 2D bitmap) of the 3D point cloud that includes the projected 3D edge points (also referred to as the fused 3D point cloud). For example, 2D bitmap can correspond with a top down representation of the fused 3D point cloud, which can include the top surfaces of the stack of boxes and pallet, as shown in FIG. 6. In this context, the 2D bitmap associated with the selected standard camera is not related to depth values of the 3D image space, but corresponds to the 2D coordinates of the image itself (e.g., x-y coordinates for pixels of the image or the coordinates along the x-axis and y-axis illustrated in FIGS. 2-4 described above). In some embodiments, pixels in the 2D bitmap can correspond with real world dimensions (i.e. the length of the pixel can correspond to a unit length or distance in the real world). In such embodiments, the robotic system 100 can use the 2D bitmap of the fused 3D point cloud for downstream processes, such as for motion planning, grip positioning, and other operations that involve the objects.

Once the fused edge information is generated, robotic system 100 may generate an object detection hypothesis based on the fused edge information at step 820. In some example implementations, the robotic system 100 can generate the object detection hypothesis based segmenting the 3D point cloud information based on the fused edges of fused edge information. For example, the robotic system 100 can segment the 3D point cloud information along the fused edges until an edge cross point is reached. The edge cross point, for example, can be locations where two or more of the fused edges intersect or, in some cases, where an intersection between an extrapolation of detected edges would be. In an example of a box shaped object, the robotic system 100 can generate the object detection hypothesis as the portion of the 3D point cloud information that is defined by two parallel pairs of the fused edges, where one parallel pair of the fused edges are perpendicular with the other parallel pair of the fused edges, along with the edge cross points that correspond with the intersection between the two parallel pairs of the fused edges. In some embodiments, the robotic system 100 can generate multiple object detection hypotheses based on different combinations of the fused edges.

By using the fused edge information to generate the object detection hypotheses, several important benefits may be achieved as discussed above with respect to FIGS. 7A and 7B. One important benefit that can be achieved is that the fused edge information may be used to more accurately and precisely segment the point cloud data compared to edge information generated from a single mode of image capture. For example, in an application for detection of objects or boxes of substantially similar heights, such as when the top surfaces of each of the boxes are of the same or similar height so that the top surfaces form a substantially horizontal plane or surface, it is possible that the portion of the point cloud (also referred to as a "point cloud layer") corresponding to the top surfaces of the boxes may be captured encompassing multiple objects or boxes. To continue the example, within the point cloud layer, the boxes or objects may have the same or similar height/depth values, making it difficult to detect individual boxes or objects (i.e. the internal contours 645 corresponding to separations between the boxes). More specifically, segmentation of the 3D point cloud data using the detected edges based on the 2D image data may yield incomplete edges (i.e. detected edges that correspond to a portion of an entire edge the actual top surface of the boxes) or false edges (i.e. detected edges that do not actually correspond to the actual edge of the top surface of the boxes, such as an edge of a box flap, a crease/wrinkle, or a part of a design/graphic/image on the top surface of the box). Further, since the boxes may be tightly packed, differences in depth that may correspond to separation between boxes may not be captured in the 3D image data. Thus, the fused edge information that combines the edge information from multiple imaging modes can improve identification of the actual object edges and increase the certainty in correlation between the edge information with the actual object edges by reducing false edge detection and/or identifying edges that would otherwise go undetected. This may allow better segmentation of the point cloud layer and improved detection of individual objects or boxes.

Another important benefit that may be achieved is that the fused edge information may be used as features for detection hypothesis generation. For example, as described above, the fused edge information may be used to detect or generate edge cross points (e.g., locations where two or more of the detected edges intersect or an intersection between an extrapolation of detected edges would be) that can correspond to the position of the corners of the contours of objects. More specifically, analysis of image data from a single imaging mode alone (i.e. edge detection based on the two-dimensional image data or the three-dimensional image data) may have a higher error probability or failure to identify edges, using the fused edge information to generate the detection hypothesis increases the probability that the object detection hypothesis will be correct.

After the object detection hypothesis is generated, the robotic system 100 can perform validation of the object detection hypothesis at step 825. In some embodiments, the robotic system 100 can validate the object detection hypothesis based on comparison of the object detection hypothesis to object descriptions for registered objects in the master data of FIG. 2. For example, the robotic system 100 can validate the object detection hypothesis by matching the contour properties (i.e. lengths of the fused edges, positions/locations of the edge cross points) of the object detection hypothesis with those that correspond to the registered objects in the master data. In some embodiments, the robotic system 100 can consider a number of factors when comparing to the registered objects during validation of the object detection hypothesis, such as the completeness of the fused edge information (i.e. whether the fused edge includes discontinuities or the length of the fused edge spans the entire distance between two cross points) which can affect the accuracy of the detected contours. For example, the robotic system 100 can provide a certainty rating of the object detection hypothesis or a degree of match with the registered objects. As a specific example, the robotic system 100 can provide a higher certainty rating for the detection hypothesis that includes a higher degree of completeness of the fused edge information, as described above. Since the fused edge information can provide the maximum possible information from the combination of available imaging devices, the fused edge information can help to increase accuracy and reliability associated with determining the exact locations of edges or contours of the objects based on the detection hypothesis. Further, possible inaccuracies of the coordinates of edge points after the transformation and projection due to factors such as point cloud noise or calibration (e.g., physical offset/angle/distance between the cameras) can be considered when determining the certainty rating or degree of match.

After validation of the object detection hypothesis, the robotic system 100 can use the object contours, pose/orientation information, and/or location information of the target object (such as the target object 112 of FIG. 1)

corresponding to the object detection hypothesis for further processing of the target object at step 830. For example, the robotic system can use the object contours, pose/orientation information, and/or location information for operations that involve manipulation of the target object, such as for grip placement of an end effector of a robot and/or motion planning calculations for moving the target object. With improved accuracy of contour and location detection, shipping or manufacturing processes may be improved. After the object contours and location has been relayed, the process 800 may repeat as necessary to generate further object detection hypotheses, which can include additional edge fusion operations according to the steps above or the process may end.

Example Computing Environment

Figure 9:
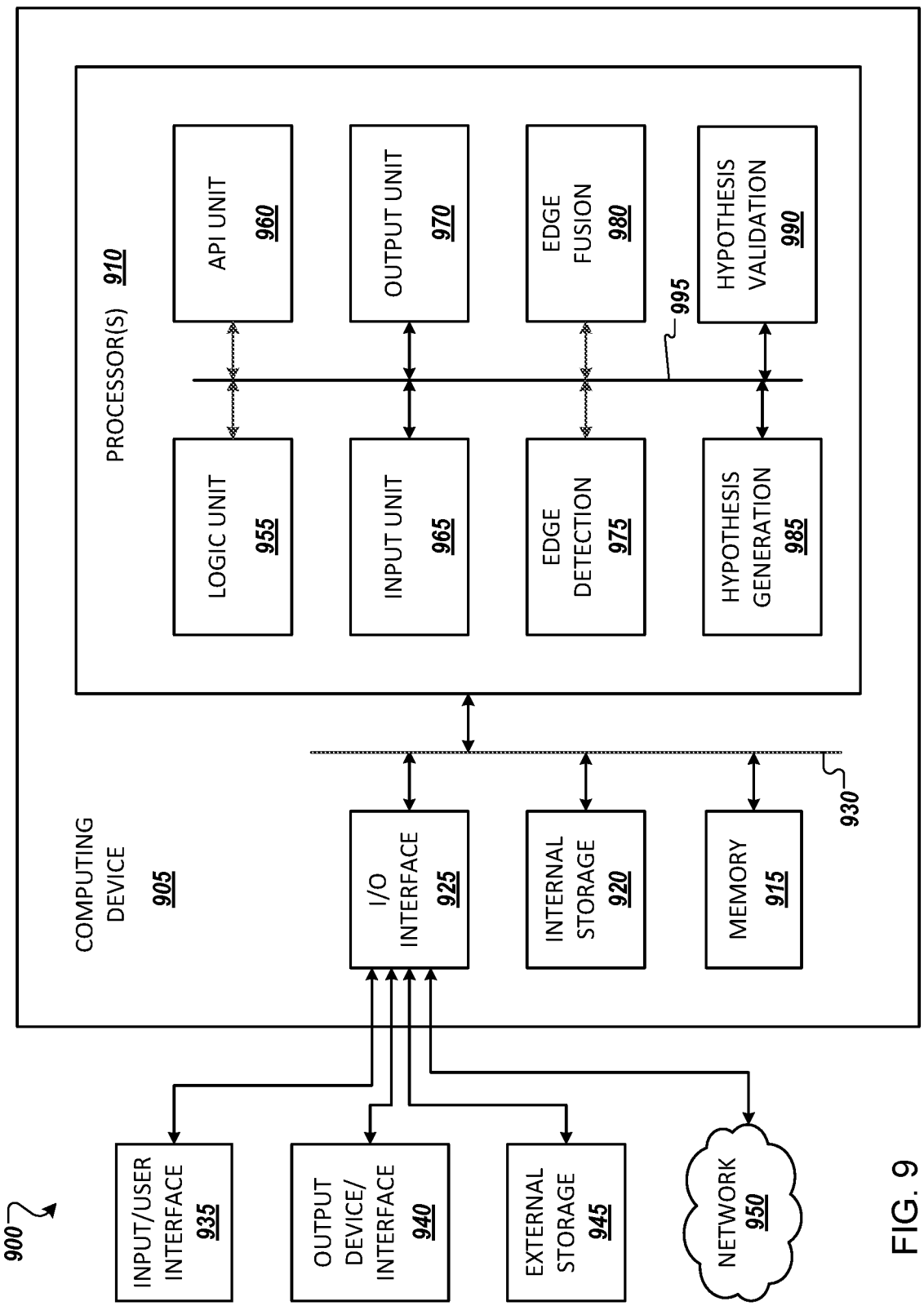
FIG. 9 illustrates an example computing environment with an example computer device suitable for use in some example implementations of the present invention.

FIG. 9 illustrates an example computing environment 900 with an example computer device 905 suitable for use in some example implementations. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computing device 905.

Computing device 905 can be communicatively coupled to input/interface 935 and output device/interface 940. Either one or both of input/interface 935 and output device/interface 940 can be a wired or wireless interface and can be detachable. Input/interface 935 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 940 may include a display, television, monitor, printer, speaker, braille, or the like. In some example implementations, input/interface 935 (e.g., user interface) and output device/interface 940 can be embedded with, or physically coupled to, the computing device 905. In other example implementations, other computing devices may function as, or provide the functions of, an input/interface 935 and output device/interface 940 for a computing device 905. These elements may include, but are not limited to, well-known AR hardware inputs so as to permit a user to interact with an AR environment.

Examples of computing device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 905 can be communicatively coupled (e.g., via I/O interface 925) to external storage 945 and network 950 for communicating with any number of networked components, devices, and systems, including one or more computing devices of the same or different configuration. Computing device 905 or any connected computing device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computing device 905 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 910 can execute under any operating system (OS) (not shown), in a native or virtual environment. One or more applications can be deployed that include logic unit 955, application programming interface (API) unit 960, input unit 965, output unit 970, edge detection unit 975, edge fusion unit 980, hypothesis generation unit 985, hypothesis validation unit 990 and inter-unit communication mechanism 995 for the different units to communicate with each other, with the OS, and with other applications (not shown).

For example, edge detection unit 975, edge fusion unit 980, hypothesis generation unit 985, and hypothesis validation unit 990 may implement one or more processes shown in FIG. 8. The described units and elements can be varied in design, function, configuration, or implementation and are not limited to the descriptions provided.

In some example implementations, when information or an execution instruction is received by API unit 960, it may be communicated to one or more other units (e.g., edge detection unit 975, edge fusion unit 980, hypothesis generation unit 985, and hypothesis validation unit 990). For example, edge detection unit 975 may automatically detect object edges from image data captured from at least two different image capturing modes and provide the detected edges to the edge fusion unit 980. The edge fusion unit 980 may fuse the detected edges to generated edge fusion data that is provided to the hypothesis generation unit 985. The hypothesis generation unit 985 may generate object detection hypotheses based on the edge fusion data and provide hypothesis validation unit 990. The hypothesis validation unit 990 may validate the generated hypotheses based on the collected image data, and the edge fusion data.

In some instances, the logic unit 955 may be configured to control the information flow among the units and direct the services provided by API unit 960, input unit 965, edge detection unit 975, edge fusion unit 980, hypothesis generation unit 985, and hypothesis validation unit 990 in some example implementations described above. For example, the flow of one or more processes or implementations may be controlled by logic unit 955 alone or in conjunction with API unit 960.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

I claim:

1. A method of detecting objects, the method comprising:
generating first edge information from first image data representing an object based on a first mode of image capture;
generating second edge information from second image data representing the object based on a second mode of image capture, the second mode being different from the first mode;
fusing the first edge information with the second edge information to generate fused edge information by combining the first edge information with the second edge information into a common image space, including:
mapping the first edge information based on coordinates of detected edges associated with the first mode of image capture;
transforming the second edge information to correspond to a three-dimensional image space associated with the first mode of image capture, including:
projecting two-dimensional edge points from the second edge information onto the three-dimensional image space based on depth information associated with the first edge information corresponding to the two-dimensional locations of the two-dimensional edge points of the second edge information to generate projected three-dimensional points associated with the second edge information,
transforming the projected three-dimensional points to correspond to the three-dimensional image space; and
projecting the transformed three-dimensional points corresponding to the three-dimensional image space to two-dimensional coordinates of images associated with the first edge information;
generating an object detection hypothesis based on the fused edge information; and
validating the object detection hypothesis based on the fused edge information, the first edge information, and/or the second edge information.

2. The method of claim 1, wherein the image data representing the object based on the first mode of image capture is image data captured by a mode of two-dimensional image capture, and
wherein detecting the first edge information includes one or more of:
CANNY Edge Detection;
Region Similarity Edge Detection; and
Line Segment Detection.

3. The method of claim 1, wherein the image data representing the object based on the first mode of image capture is image data captured by a mode of three-dimensional image capture, and
wherein detecting the first edge information includes:
projecting the image data captured using the first mode into an image space associated with one or more objects to be detected; and
extracting object edges from a projected 3D point cloud.

4. A non-transitory computer readable medium encoded with instructions for making a computing device execute a method of detecting objects, the method comprising:
generating first edge information from first image data representing an object based on a first mode of image capture;
generating second edge information from second image data representing the object based on a second mode of image capture, the second mode being different from the first mode;
fusing the first edge information with the second edge information to generate fused edge information by combining the first edge information with the second edge information into a common image space, including:
mapping the first edge information based on coordinates of detected edges associated with the first mode of image capture;
transforming the second edge information to correspond to a three-dimensional image space associated with the first mode of image capture, including:
projecting two-dimensional edge points from the second edge information onto the three-dimensional image space based on depth information associated with the first edge information corresponding to the two-dimensional locations of the two-dimensional edge points of the second edge information to generate projected three-dimensional points associated with the second edge information,
transforming the projected three-dimensional points to correspond to the three-dimensional image space; and
projecting the transformed three-dimensional points corresponding to the three-dimensional image space to two-dimensional coordinates of images associated with the first edge information;
generating an object detection hypothesis based on the fused edge information; and
validating the object detection hypothesis based on the fused edge information, the first edge information, and/or the second edge information.

5. The non-transitory computer readable medium of claim 4, wherein the first image data representing the object based on the first mode of image capture is image data captured by a mode of two-dimensional image capture, and
wherein detecting the first edge information includes one or more of:
CANNY Edge Detection;
Region Similarity Edge Detection; and
Line Segment Detection.

6. The non-transitory computer readable medium of claim 4, wherein the first image data representing the object based on the first mode of image capture is image data captured by a mode of three-dimensional image capture, and
wherein detecting the first edge information includes:

projecting the image data captured using the first mode into an image space associated with one or more objects to be detected; and extracting object edges from a projected 3D point cloud.

7. An object detection system for detecting objects, the system comprising:
- a system interface configured for receiving first image data representing an object based on a first mode of image capture and receiving second image data representing the object based on a second mode of image capture, the second mode being different from the first mode;
- a processor, communicatively coupled to the system interface, the processor configured to perform an object detection method comprising:
  - generating first edge information from the first image data representing an object based on a first mode of image capture;
  - generating second edge information from the second image data representing an object based on a second mode of image capture, the second mode being different from the first mode;
  - fusing the first edge information with the second edge information to generate fused edge information by combining the first edge information with the second edge information into a common image space, including:
    - mapping the first edge information based on coordinates of detected edges associated with the first mode of image capture;
    - transforming the second edge information to correspond to a three-dimensional image space associated with the first mode of image capture, including:
      - projecting two-dimensional edge points from the second edge information onto the three-dimensional image space based on depth information associated with the first edge information corresponding to the two-dimensional locations of the two-dimensional edge points of the second edge information to generate projected three-dimensional points associated with the second edge information;
      - transforming the projected three-dimensional points to correspond to the three-dimensional image space; and
      - projecting the transformed three-dimensional points corresponding to the three-dimensional image space to two-dimensional coordinates of images associated with the first edge information;
  - generating an object detection hypothesis based on the fused edge information; and
  - validating the object detection hypothesis based on the fused edge information, the first edge information, and/or the second edge information.

8. The object detection system of claim 7, wherein the first image data representing the object based on the first mode of image capture is image data captured by a mode of three-dimensional image capture, and
wherein detecting the first edge information includes:
projecting the image data captured using the first mode into an image space associated with one or more objects to be detected; and
extracting object edges from a projected 3D point cloud.

* * * * *